Figure 1:
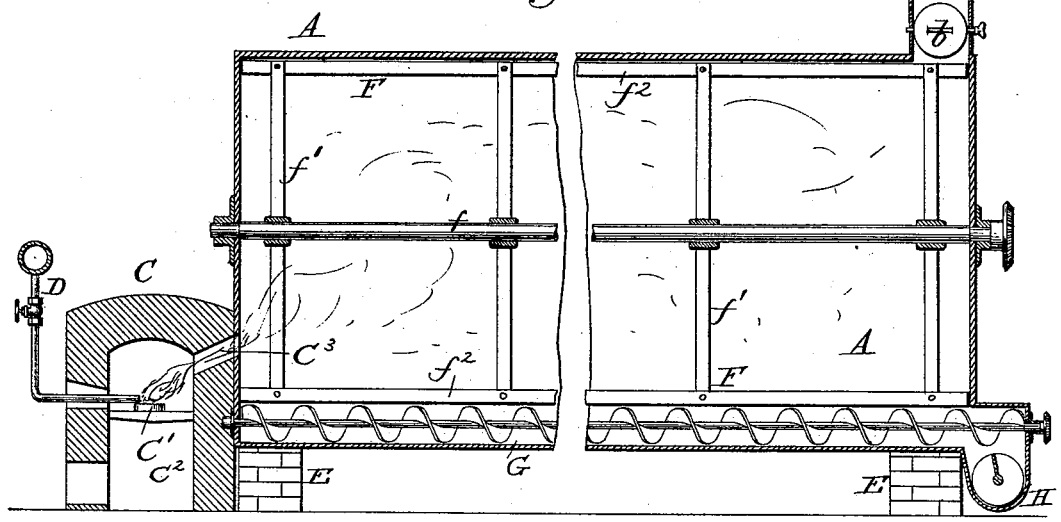

(No Model.)

E. BINNEY.
APPARATUS FOR THE MANUFACTURE OF CARBON BLACK.

No. 453,140. Patented May 26, 1891.

Attest:

Inventor
EDWIN BINNEY
by his attorneys

UNITED STATES PATENT OFFICE.

EDWIN BINNEY, OF NEW YORK, N. Y., ASSIGNOR OF ONE-HALF TO C. HAROLD SMITH, OF SAME PLACE.

APPARATUS FOR THE MANUFACTURE OF CARBON-BLACK.

SPECIFICATION forming part of Letters Patent No. 453,140, dated May 26, 1891.

Application filed March 9, 1891. Serial No. 384,342. (No model.)

*To all whom it may concern:*

Be it known that I, EDWIN BINNEY, a citizen of the United States, residing in the city, county, and State of New York, have invented certain new and useful Improvements in Apparatus for the Manufacture of Carbon-Black, Lamp-Black, &c., of which the following is a specification.

The objects of my invention are to manufacture lamp-black from oil in an improved and economical manner, whereby waste of the product and unnecessary expenditure of labor are avoided, and to manufacture carbon-black from gas in such manner as to obtain an improved quality of black which shall have the soft flaky texture of lamp-black and the superior color of carbon-black made in the ordinary ways.

The general practice heretofore in making lamp-black from oil has been to throw the oil-flame into a closed specially-constructed building, and after the operation has been continued for the requisite length of time the flame is shut off and the building allowed to cool and workmen are sent into it to scrape the deposited lamp-black from its walls and remove it from the building. There are objections to this manner of operation, the principal ones being, first, there is a considerable waste of the product; second, the cost of labor for removing the lamp-black from the building, and, third, the time lost in the cooling of the building before the workmen can enter it. For these reasons the cost of the product is unnecessarily increased beyond what it should be.

In making carbon-black from gas it has heretofore been the custom to cause the gas-flame to impinge directly against a metal surface, from which the deposited black is removed by scrapers. The objection to this method of operation is that the high heat to which the deposited black is subjected during its deposition or subsequently gives it a granular or crystalline form, which may readily be observed under a suitable glass. For some purposes therefore, notwithstanding the superior color of carbon-black—as, for instance, in the manufacture of ink—it is necessary to mix with it lamp-black, which has a softer and more flaky texture.

In my invention I avoid the impingement of the flame upon metallic surfaces in the manner in which it has heretofore been done and conduct the carboniferous vapors or products of combustion into a chamber, on the inner walls of which the carbon is deposited. In other words, such black, whether lamp-black from oil or carbon-black from gas, as is formed in the depositing-chamber of my improved apparatus, is not formed by the impingement of a flame upon a metal surface. If, therefore, the flame should be caused to impinge more or less against a metallic surface, whereby more or less black would be deposited thereupon, such portion of the flame, products of combustion, or carboniferous vapors as are conducted from said plate into the depositing-chamber will deposit their lamp-black or carbon-black upon the walls of the chamber.

My invention therefore comprehends an improved organization of apparatus involving a depositing-chamber, into which the carboniferous vapors are conducted, the flame being preferably not directed into the chamber, as it is desired that the chamber be kept as cool as possible, and if the flame or any portion of it does enter the chamber it does not impinge directly against the walls thereof in the manner in which such flames have heretofore been caused to impinge upon metal plates, as above stated, and a scraper acting upon the walls of the chamber to remove the black therefrom, the action of the scraper being due to the movement of these parts relatively to each other, the chamber preferably being stationary and the scraper operated therein by suitable mechanism.

The invention further comprehends in such an organization a conveyer arranged within the chamber, upon or into which the black scraped from the walls of the chamber is deposited and removed by the conveyer from the chamber. By preference the scraper and conveyer would both be continuously operated by power, so that the operation of removing the black from the walls of the chamber and conveying it thence to a suitable receptacle is a continuous and automatic one. I may employ a series or gang of such chambers and scrapers and have the conveyer of each chamber deliver the black to a common conveyer, which carries it to the storehouse or receptacle.

Figure 2:
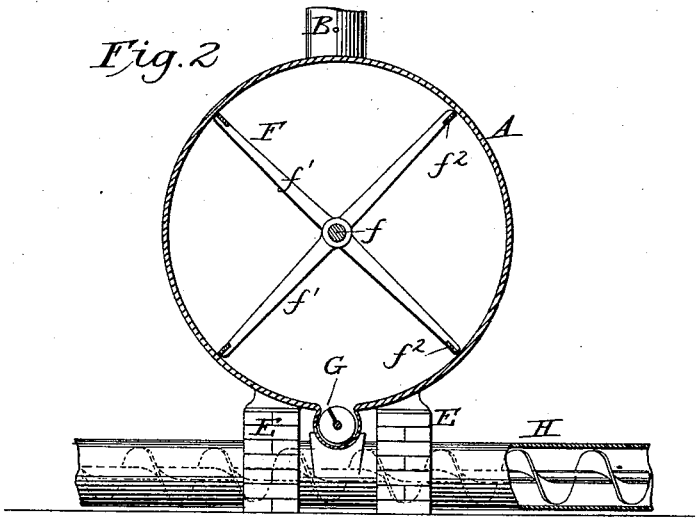
Figure 3:
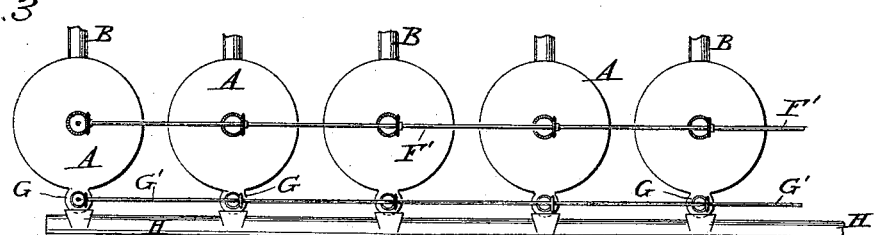

In the accompanying drawings, Figure 1 is a longitudinal section through an apparatus embodying my invention; Fig. 2, a transverse section thereof, and Fig. 3 an end view of a gang of depositing-chambers with the scrapers geared together.

The collecting or depositing chamber A is in this instance shown as of cylindrical form, its front and rear ends being closed. At the front end of the chamber is a smoke pipe or stack B, having a draft-regulating damper $b$ therein. A furnace C is located at the opposite end of the cylinder. The cylinder is shown as mounted on a masonry or other foundation E. The scraper F is arranged within the cylinder, and in this instance it is shown as consisting of a shaft $f$, having bearings in the front and rear ends of the cylinder and carrying a series of radial arms or spiders $f'$, to the outer ends of which are secured longitudinal plates $f^2$, that are in close proximity to the interior surface of the cylinder and act as scrapers. When the shaft $f$ is revolved, the scrapers disengage the lamp-black or carbon-black from the surface of the cylinder and it falls into a trough G, extending longitudinally along the bottom of the cylinder. Within this trough is any suitable conveyer, a screw conveyer in this instance being shown. The black delivered into the trough is by the action of the conveyer carried forward to its discharge end, from whence it may fall into a suitable receptacle or be received by another conveyer and carried to the desired point. When a gang or series of depositing-chambers are employed, they are preferably arranged side by side, as shown in the drawings, and the black delivered from the trough G of each chamber falls into a transverse trough H, provided with a conveyer that carries the black to the storehouse. The conveyers of the several troughs G may be geared or belted, as shown, to a common shaft $G'$, from which they are all simultaneously driven. In like manner the shafts $f$ of the scrapers may be driven from the common driving-shaft $F'$.

The furnace C is of any ordinary construction suitable for the purpose herein indicated. When oil is to be burned for the manufacture of lamp-black, the construction illustrated may be adopted—that is to say, the oil is supplied through a pipe D in regulated quantity to a pot $C'$ within the furnace and above the fire-box $C^2$. In starting the apparatus or as long as may be considered necessary or desirable a fire may be maintained in the fire-box $C^2$. The carboniferous vapors or products of combustion pass from the furnace by a passage-way $C^3$, leading into the end of the cylinder or depositing-chamber.

Where lamp-black is being made from oil, the interior of the cylinder or depositing-chamber may be lined with zinc or other suitable material, as is well understood in the art. Where carbon-black is being made from gas, the flame may be burned from the end of the pipe D. The specific details of the furnace or oil or gas burner, however, will be readily understood by those skilled in the art, and do not form any part of my present invention.

With this apparatus the operation of making lamp or carbon black may be automatically continued without interruption for long periods of time, the power required for working the conveyers and scrapers is small, and the number of attendants or operators very few.

I claim as my invention—

1. The combination of a depositing-chamber having a draft-opening and an inlet for carboniferous vapors or products of combustion, a suitable burner or furnace for oil or gas arranged in proper relation to said inlet, a scraper arranged within and acting on the interior surface of the chamber to remove the lamp or carbon black therefrom, and means for operating the scraper from the outside of the depositing-chamber.

2. The combination of a burner or furnace, a chamber the depositing-wall of which is out of contact with the flame from the burner, the scraper arranged therein and operating upon the walls of the chamber to remove the black therefrom, and a conveyer arranged at the bottom of the chamber and acting to convey the black therefrom.

3. The combination of a furnace or burner, a depositing-chamber the wall of which is out of contact with the flame from the burner and having a draft-outlet and an inlet for carboniferous vapors or products of combustion, a scraper arranged within and acting to remove the black from the surface of the chamber, means for producing the movement of one of these parts relatively to the other, a conveyer arranged at the bottom of the chamber, and means for operating the conveyer to convey the black from the chamber.

4. The combination of the furnace, the cylindrical chamber, the passage from the furnace to the chamber, the rotary scraper arranged within the chamber, and a conveyer for removing the black from the chamber.

5. The combination, substantially as hereinbefore set forth, of a closed chamber into which carboniferous vapors are conveyed from an outside furnace or burner, a scraper traversing the depositing-walls of the chamber, and a conveyer for removing the carbon from the chamber.

6. The combination, substantially as hereinbefore set forth, of a series of stationary cylindrical depositing-chambers arranged side by side, rotary scrapers therein, gearing connecting the scrapers to rotate coincidently, conveyers for carrying off the black removed from the chambers by the scrapers, and gearing for causing the conveyers to move coincidently.

7. The combination of a series of depositing-chambers, each having an inlet for carboniferous vapors and a draft-outlet, a scraper arranged in each chamber, a conveyer in each chamber for removing the black therefrom, and a common conveyer for receiving the black from all the chambers and conveying it to the desired point.

In testimony whereof I have hereunto subscribed my name.

EDWIN BINNEY.

Witnesses:
 FRANK S. OBER,
 EDWARD C. DAVIDSON.